(12) United States Patent
Day, II et al.

(10) Patent No.: US 8,479,196 B2
(45) Date of Patent: *Jul. 2, 2013

(54) NESTED VIRTUALIZATION PERFORMANCE IN A COMPUTER SYSTEM

(75) Inventors: Michael D. Day, II, Cary, NC (US);
Ryan A. Harper, Austin, TX (US);
Anthony N. Liguori, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 929 days.

This patent is subject to a terminal disclaimer.

(21) Appl. No.: 12/564,524

(22) Filed: Sep. 22, 2009

(65) Prior Publication Data

US 2011/0072428 A1    Mar. 24, 2011

(51) Int. Cl.
*G06F 9/455* (2006.01)

(52) U.S. Cl.
USPC .............................................................. 718/1

(58) Field of Classification Search
None
See application file for complete search history.

(56) References Cited

U.S. PATENT DOCUMENTS

| | | | |
|---|---|---|---|
| 7,318,141 B2 * | 1/2008 | Bennett et al. | 711/202 |
| 2005/0289541 A1 | 12/2005 | Mondal et al. | |
| 2006/0123184 A1 | 6/2006 | Mondal et al. | |
| 2007/0028238 A1 | 2/2007 | Bennett et al. | |
| 2008/0244571 A1 | 10/2008 | Bennett et al. | |
| 2009/0007103 A1 | 1/2009 | Bennett et al. | |
| 2009/0007112 A1 | 1/2009 | Moriki et al. | |

OTHER PUBLICATIONS

Intel 64 and IA-32 Architecture Software Developer's Manual, vol. 2B: Instruction Set Reference, N-Z, Mar. 2009, 796 pages.
Fisher-Ogden, "Hardware Support for Efficient Virtualization," University of California, San Diego, 2006, 12 pages.

* cited by examiner

*Primary Examiner* — Jennifer To
*Assistant Examiner* — Eric C Wai
(74) *Attorney, Agent, or Firm* — Walter W. Duft

(57) ABSTRACT

A virtualization architecture for improving the performance of nested virtualization in a computer system. A virtualization instruction reads or writes data in a control structure used by a virtual machine monitor (VMM) to maintain state on a virtual machine (VM) to support transitions between a root mode of operation of a CPU in which the VMM executes and a non-root mode of operation of the CPU in which the VM executes. A privileged data access is made to a primary control structure according to the virtualization instruction if the CPU is in the root mode. A non-privileged data access is made to a secondary control structure according to the virtualization instruction if the CPU is in the non-root mode and a secondary control structure field in the primary control structure is enabled.

14 Claims, 6 Drawing Sheets

NESTED VIRTUALIZATION PERFORMANCE IN A COMPUTER SYSTEM

BACKGROUND

1. Field of the Invention

The present invention relates to hardware-assisted virtualization of data processing resources. More particularly, the invention concerns improvements in providing multiple layers of hardware-assisted virtualization.

2. Description of the Prior Art

By way of background, modern microprocessors, such as those based on the x86 architecture, include hardware-assisted support for virtualization. A set of virtualization instructions allows a hypervisor to operate in a super-privileged root mode while running guest operating systems and application software in non-root mode at their normal privilege levels. The x86 hardware virtualization feature is presently not virtualized itself. This may prevent an x86 root-mode hypervisor from efficiently running a non-root mode hypervisor as a guest, a concept known as nested or layered virtualization. The two main techniques to address this shortcoming are trap-and-emulate and dynamic translation. Trap-and-emulate involves the hardware trapping individual virtualization instructions issued by the guest hypervisor and having the root-mode hypervisor emulate their behavior. The high frequency of virtualization instructions in the critical code paths can make this mechanism prohibitively slow. Dynamic translation involves translating the guest hypervisor's privileged code sequences to instructions that are safely confined within the guest virtual machine. This is complicated and may have an unacceptably high performance impact on certain workloads.

SUMMARY

A virtualization architecture for improving the performance of nested virtualization in a computer system. A virtualization instruction reads or writes data in a control structure used by a virtual machine monitor (VMM) to maintain state on a virtual machine (VM) to support transitions between a root mode of operation of a CPU in which the VMM executes and a non-root mode of operation of the CPU in which the VM executes. A privileged data access is made to a primary control structure according to the virtualization instruction if the CPU is in the root mode. A non-privileged data access is made to a secondary control structure according to the virtualization instruction if the CPU is in the non-root mode and a secondary control structure field in the primary control structure is enabled.

BRIEF DESCRIPTION OF THE DRAWINGS

The foregoing and other features and advantages of the invention will be apparent from the following more particular description of disclosed embodiments, as illustrated in the accompanying Drawings, in which.

DETAILED DESCRIPTION OF EXAMPLE EMBODIMENTS

Figure 1:
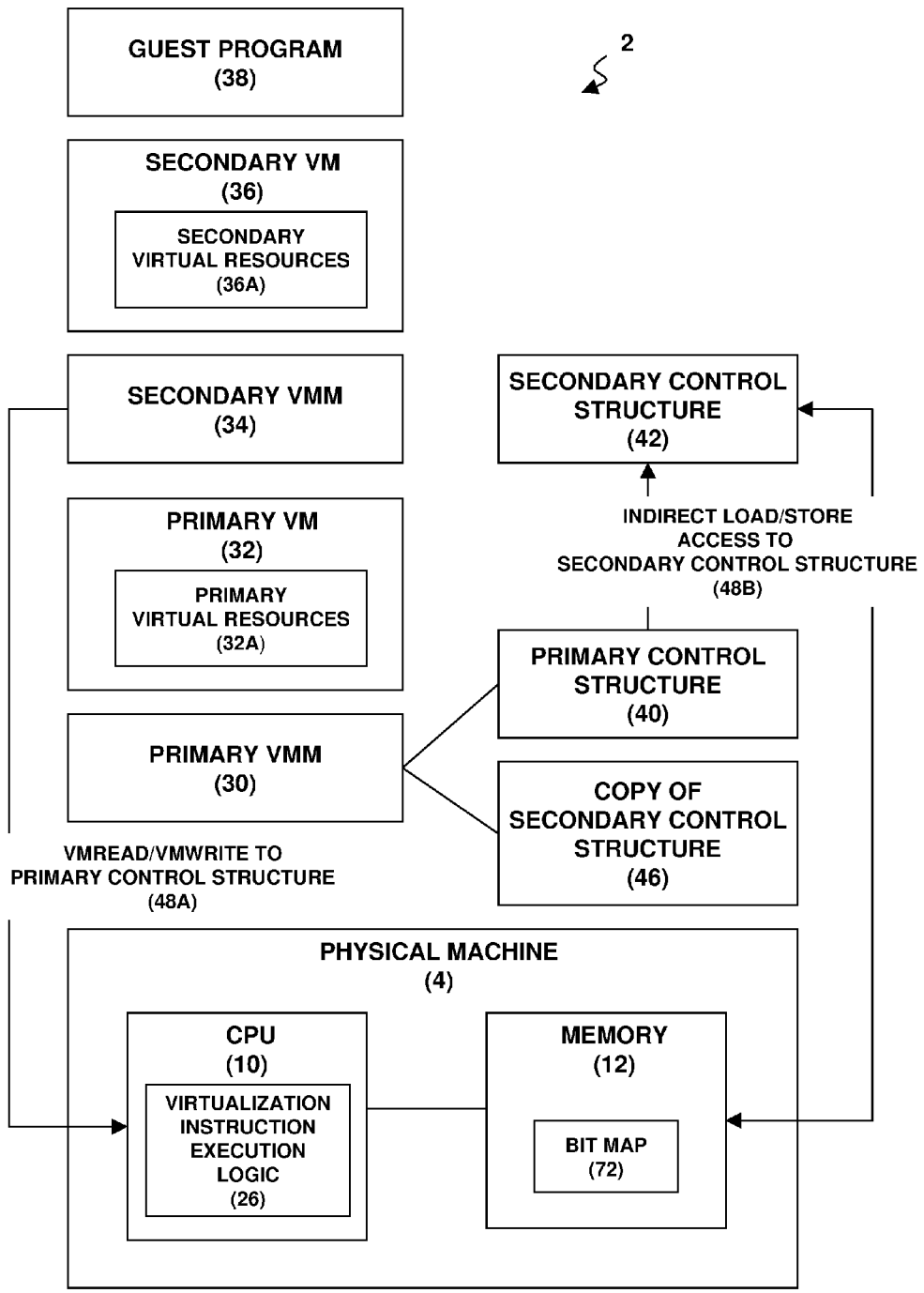
FIG. 1 is a functional block diagram showing a computer system implementing nested virtualization in accordance with a disclosed embodiment.

Turning now to the figures, wherein like reference numerals represent like elements in all of the several views, FIG. 1 illustrates an example computer system 2 configured to support nested virtualization. The system 2 includes a physical machine 4 that incorporates at least one CPU (Central Processing Unit) 10 and a memory 12 operatively coupled to the CPU 10. The CPU is an integrated circuit that may be implemented as an execution core of a single-core or multi-core microprocessor, or in any other type of instruction processing device, such as general purpose processor, a micro-controller, a signal processor, etc. The CPU 10 may implement the x86 architecture, but this is not a requirement for practicing the nested virtualization technique disclosed herein. The memory 12 may be implemented using any type of computer readable storage medium capable of storing program instructions and data. Example memory types include, but are not limited to, static or dynamic random-access memory, semiconductor read-only or flash memory, magnetic or optical disk memory, or combinations thereof.

Figure 2:
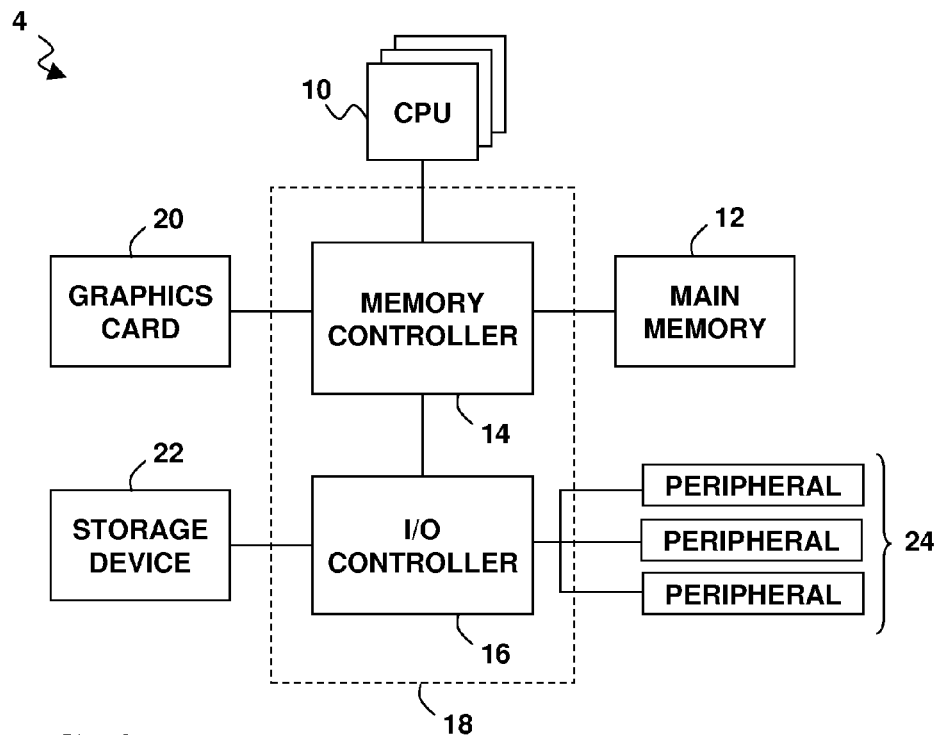
FIG. 2 is a functional block diagram showing example components that may be included in the system of FIG. 1.

By way of example only, and without limitation, the physical machine 4 may be embodied in any of a general purpose computer, a special purpose computer, a portable computing device, a communication device, a multimedia or audio presentation device, a set-top device, an embedded system, a dedicated logic or control system, to name but a few. One example configuration is shown in FIG. 2, wherein the physical machine 4 includes plural CPUs 10 interconnected to the memory 12 by way of a memory controller 14. The memory controller 14 may be implemented in conjunction with an I/O (Input/Output) controller 16 in a chipset that provides an integrated bus infrastructure 18. Memory controller functionality could also be integrated with each CPU 10. Additional components that may be added to the physical machine 4 include an optional graphics card 20 that may be connected to the memory controller hub 14 for generating visual output information to an optional display monitor (not shown). A peripheral storage device 22, such as a magnetic or optical disk drive, may also be connected to the I/O controller 16. Various peripheral devices 24 may further be connected to the I/O controller 16. The peripheral devices 24 may include a USB bus controller, a SCSI disk controller, and a NIC, among other types of devices.

Persons skilled in the art will appreciate that the physical machine 4 may be implemented in many other ways, either with or without some or all of the additional components mentioned above. It will be further appreciated that the physical machine 4 may include other well known components beyond what is shown in FIG. 2. Such components will not be described in the interest of brevity and in order not to obscure the disclosed subject matter.

Returning now to FIG. 1, the CPU 10 of the physical machine 4 supports a super-privileged mode of operation known as root mode that may be used by virtualization software (or firmware), such as a virtual machine monitor (a.k.a. hypervisor) to support virtual machine environments. A non-root mode of operation is also provided for running standard operating systems and application software at their normal privilege levels within a virtual machine environment. The CPU 10 also comprises virtualization instruction execution logic 26 that supports hardware virtualization. The virtualization logic 26 may be implemented as microcode or other logic that executes virtualization instructions issued by a virtual machine monitor running on the physical machine 4. The virtualization instruction set supported by the virtualization logic 26 may include instructions for switching from root mode to non-root mode to enter a virtual machine environment from a virtual machine monitor, and for switching from non-root mode to root mode to exit a virtual machine environment and return control to a virtual machine monitor. The VMX (Virtual Machine eXtensions) instruction set provided by the Intel® VT-x virtualization architecture represents one example technology that may be used as a starting point for implementing the virtualization logic 26. Further aspects of the virtualization logic 26, including modifications that can be made to the conventional Intel® VMX instruction set to implement nested virtualization in accordance with the present disclosure, are described in more detail below.

Still referring to FIG. 1, a primary virtual machine monitor (primary VMM) 30 executes on the physical machine 4 to provide a primary virtual machine (primary VM) 32. This represents a first virtualization layer of the nested virtualization environment shown in FIG. 1. A secondary virtual machine monitor (secondary VMM) 34 executes as a guest on the primary VM 32 to provide a secondary virtual machine (secondary VM) 36. This represents a second virtualization layer of the nested virtualization environment shown in FIG. 1. A guest program 38 executes as a guest on the secondary VM 38. Although not shown in FIG. 1, plural instances of the primary VM 32 could be provided by the primary VMM 30. Within each primary VM instance, an instance of the secondary VMM 34 could itself run plural instances of the secondary VM 36. Similarly, each secondary VM instance could run plural instances of the guest program 38, or other programs that may include additional levels of nested VMM/VM logic.

The primary VMM 30 may be implemented using any conventional virtual machine monitor or hypervisor that is compatible with the physical machine 4, and which utilizes the virtualization logic 26 to support its virtualization operations. If implemented in software, such a program may be loaded into the memory 12, and when executed by the CPU 10, will perform the functions of the primary VMM 30. A firmware-based or hardware-based virtual machine monitor program could also be used. In some cases, the primary VMM 30 may be part of an operating system kernel, such as a kernel module or driver. In other cases, it may be a stand-alone virtual machine monitor. The functions of the primary VMM 30 include establishing the primary VM 32, which provides a first-level virtualization environment to which a portion of the hardware resources of the physical machine 4 are allocated (e.g., CPU time slices and memory addresses). The assigned hardware resources may be referred to generally as virtual resources, and because they are assigned to the primary VM 32, they may be referred to specifically as primary virtual resources, as shown by reference numeral 32A in FIG. 1. A guest running on the primary VM 32, in this case the secondary VMM 34, will see the primary virtual resources 32A as if they represented a dedicated physical machine, and will operate accordingly. As indicated above, the primary VMM 30 may support more than one primary VM 32. Each additional primary VM 32 may run any type of software, including additional instances of the secondary VMM 34.

The secondary VMM 34 may also be implemented using any conventional virtual machine monitor or hypervisor that is compatible with the primary VM 32. In addition, the secondary VMM 34 may utilize the virtualization logic 26 of the CPU 10 to support its virtualization operations. If implemented in software, such a program may be loaded into the memory 12, and when executed by the CPU 10, will perform the functions of the secondary VMM 34. A firmware-based or hardware-based virtual machine monitor program could also be used. In some cases, the primary VMM 30 may be part of an operating system kernel, such as a kernel module or driver. In other cases, it may be a stand-alone virtual machine monitor. The functions of the secondary VMM 34 include establishing the secondary VM 36, which provides a second-level virtualization environment to which a portion of the primary virtual resources 32A of the primary VM 32 are allocated (e.g., CPU time slices and memory addresses). The assigned hardware resources may be referred to generally as virtual resources, and because they are assigned to the secondary VM 36, they may be referred to specifically as secondary virtual resources, as shown by reference numeral 36A in FIG. 1. A guest running on the secondary VM 36, in this case the guest program 38, will see the secondary virtual resources 36A as if they represented a dedicated physical machine, and will operate accordingly. As indicated above, the secondary VMM 34 may support more than one secondary VM 36. As also indicated above, each additional secondary VM 36 may run any type of software, including additional instances of the guest program 38, or other programs that may include additional levels of nested VMM/VM logic.

The guest program 38 may itself be any program that is capable of running on the secondary VM 36. This may include an operating system, an application program, or as stated, another virtual machine monitor. If the guest program 38 is an operating system, it may run one or more application programs in conventional fashion. If the guest program 38 is another virtual machine monitor, it may create a tertiary virtual machine (not shown) representing a third virtualization layer of the nested virtualization environment shown in FIG. 1. It will be appreciated that additional nested virtualization layers could be provided, depending on system requirements.

Figure 3:
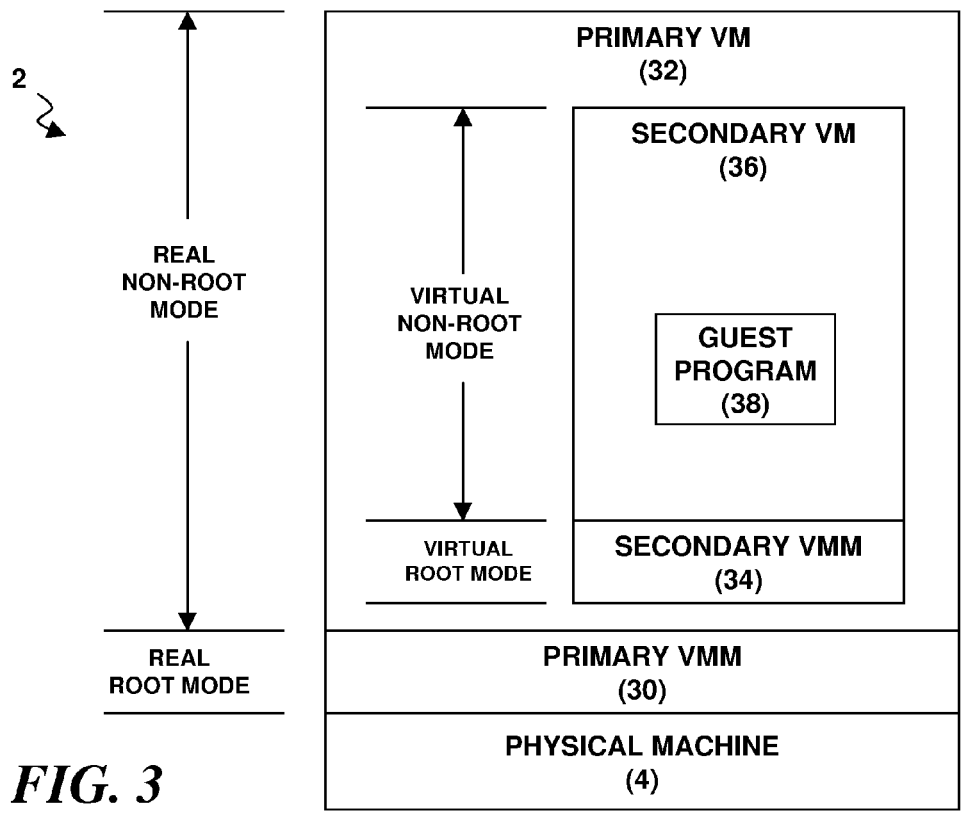
FIG. 3 is a functional block diagram showing example operational modes of the system of FIG. 1.

As previously indicated, the CPU 10 of physical machine 4 supports a root mode of operation for use by a virtual machine monitor and a non-root mode of operation for other software running within a virtual machine. The primary VMM 30 operates in the CPU's root mode. As shown in FIG. 3, this may be thought of as a real root mode of operation that the primary VMM 30 uses to establish and control the primary VM 32. Guests running within the primary VM 32, including the secondary VMM 34, operate in the CPU's non-root mode. This may be thought of as a real non-root mode of operation. As further shown in FIG. 3, the primary VM 32 may also be considered to have a virtual root mode of operation in which the secondary VMM 34 executes to control the secondary VM 36. The primary VM 32 may likewise be considered to have a virtual non-root mode of operation. Guests of the secondary VM 36, such as the guest program 38, operate in the primary VM's virtual non-root mode.

Figure 4:
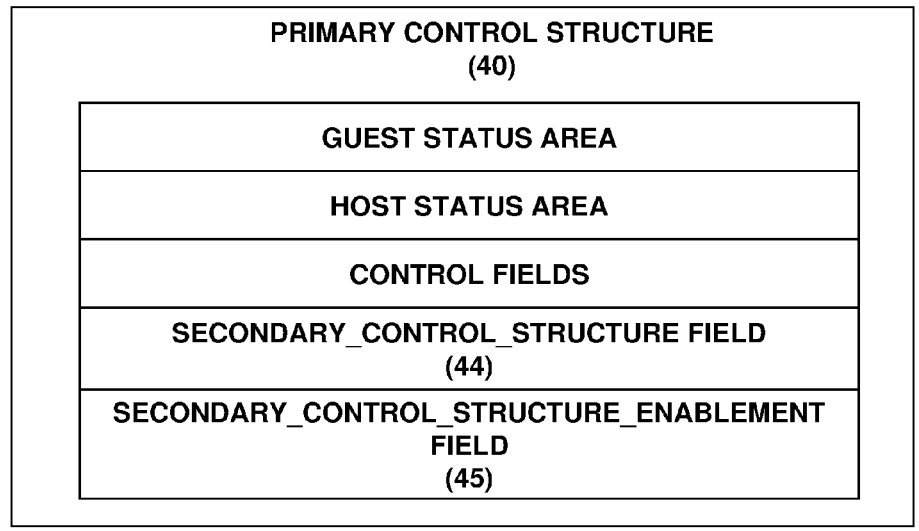
FIG. 4 is a diagrammatic illustration of an example control structure according to a disclosed embodiment.

During operation of the physical machine 4, the execution state will periodically shift between the real root mode and the real non-root mode. Initially, the CPU 10 may run in real root mode in which the primary VMM 30 performs its virtual machine monitor functions. Thereafter, the primary VMM 30 may cause the physical machine 4 to leave the real root mode and enter the real non-root mode in order to execute the primary VM 32. This may be referred to as a VM-entry. Thereafter, an event may cause the physical machine 4 to exit the real non-root mode and return to the real root mode for event handling by the primary VMM 30. This may be referred to as a VM-exit. As shown in FIG. 1, a primary control structure 40 may be used by the primary VMM 30 to maintain state on the primary VM 32 in order to support VM-entry and VM-exit transitions between the real root mode and the real non-root mode. The primary control structure 40 may be implemented as a data structure stored in the memory 12 (or within internal memory of the CPU 10), and may be patterned after the VMCS (Virtual Machine Control Structure) used by the Intel® VT-x virtualization architecture. As persons skilled in the art will appreciate, and as shown in FIG. 4, the primary control structure 40 may thus contain a host status area that stores a copy of the primary VMM's CPU state while the primary VM 32 is running, and a guest status area that stores a copy of the primary VM's CPU state while the primary VMM 30 is running. The primary control structure 40 may also contain control fields that indicate, among other things, the conditions that will trigger a VM-exit (such as a non-root mode program issuing a privileged instruction) and how such events should be handled.

In analogous fashion to what transpires in the physical machine 4, during operation of the primary VM 32, the execution state will periodically shift between the virtual root mode and the virtual non-root mode. Initially, the primary VM 32 may run in virtual root mode in which the secondary VMM 34 performs its virtual machine monitor functions. Thereafter, the secondary VMM 34 may cause the primary VM 32 to leave the virtual root mode and enter the virtual non-root mode in order to execute the secondary VM 36 (VM-entry). Thereafter, an event may cause the primary VM 32 to exit the virtual non-root mode and return to the virtual root mode for event handling by the secondary VMM 34 (VM-exit). As shown in FIG. 1, a secondary control structure 42 may be used by the secondary VMM 34 to maintain state on the secondary VM 36 in order to support VM-entry and VM-exit transitions between the virtual root mode and the virtual non-root mode. The secondary control structure 42 may be implemented as a data structure stored in the memory 12. Like the primary control structure 40, the secondary control structure 42 may be patterned after the VMCS (Virtual Machine Control Structure) used by the Intel® VT-x virtualization architecture. As persons skilled in the art will readily appreciate, the secondary control structure 42 may thus contains a host status area that stores a copy of the secondary VMM's CPU state while the secondary VM 36 is running, and a guest status area that stores a copy of the secondary VM's CPU state while the secondary VMM 34 is running. The secondary control structure 42 may also contain control fields that indicate, among other things, the conditions that will trigger a VM-exit (such as a non-root mode program issuing a privileged instruction) and how such events should be handled.

The virtualization logic 26 of the CPU 10 includes control structure read/write instructions that may be used to read and write data in the primary control structure 40 and the secondary control structure 42. In the Intel® VT-x virtualization architecture, these instructions are respectively called VMREAD and VMWRITE. However, the existing VMREAD and VMWRITE instructions are privileged and can only be executed in the real root mode of the physical machine 4. This means that in a conventional implementation of the Intel® VT-x virtualization architecture, the primary VMM 30 could directly execute such instructions, but the secondary VMM 34 could not. VMREAD and VMWRITE instructions issued by the secondary VMM 34 would have to be trapped and emulated by the primary VMM 30, or dynamic translation would have to be used. In either case, substantial overhead would be incurred in order to support nested virtualization because the primary VMM 30 would be repeatedly invoked to not only read and write data in its own primary control structure 40, but also in the secondary control structure 42 and in the control structures of any other secondary (or higher level) virtual machine monitors that may be running in the system 2. This situation is further aggravated by the fact that a separate VMREAD or VMWRITE instruction is required to read or write data into each field of the guest status area, the host status area, and the control fields, and dozens of such fields must typically be read from or written to on each VM-entry and VM-exit transition.

A solution to this problem is provided herein by modifying the virtualization logic 26 within the CPU 10 so that VMREADs and VMWRITEs may be executed by the secondary VMM 34 in virtual root mode to read and write the secondary control structure 42 without support from the primary VMM 30. A new field is also added to the primary control structure 40 to indicate that the presence of the secondary control structure 42. This field, which may be referred to as the secondary_control_structure field 44, is shown in FIG. 4. It may be implemented as a pointer to an address in the memory 12 that represents the base address of the secondary control structure 42. The secondary_control_structure field 44 is managed by the primary VMM 30. In particular, the primary VMM 30 sets the secondary_control_structure field 44 prior to launching the secondary VMM 34 for the first time. If desired, the primary VMM 30 could selectively enable the secondary_control_structure field 44 in a suitable manner, such as by setting a bit in a control field of the primary control structure 40. This bit is shown by reference number 45 in FIG. 4, and may be referred to as a secondary_control_structure_enablement field. By way of example only, if the primary control structure 40 is based on the VMCS used in the Intel® VT-x virtualization architecture, a bit could be set in the Secondary Processor-Based VM-Execution Controls vector. Optionally, the secondary_control_structure_enablement field 45 could be eliminated, depending on design requirements. The virtualization logic 26 that executes the VMREAD and VMWRITE instructions may be configured to reference the secondary_control_structure field 44 if it is enabled and the instruction caller is operating in non-root mode. In that case, the virtualization logic 26 will treat the VMREAD or VMWRITE as a non-privileged memory load or store, respectively, within the memory region identified by the pointer. This non-privileged operation may be performed by the secondary VMM 34 without assistance from the primary VMM 30, thereby reducing the overhead associated with trap and emulate or dynamic translation operations. Thus, as shown in FIG. 1, when the secondary VMM 34 issues a VMWRITE/VMREAD instruction 48A seeking to access the primary control structure 40 in non-root mode, the virtualization logic 26 effectively redirects the access and implements a load/store operation 48B to access the secondary control structure 42 in the memory 12. If, on the other hand, the secondary_control_structure field 44 is not enabled, non-root VMREAD and VMWRITE instructions will trap and be passed to the primary VMM 30 for emulation. If the VMREAD and VMWRITE instructions are issued in root mode by the primary VMM 30, the secondary_control_structure field 44 is ignored and the data access is performed within the primary control structure 40.

Example pseudocode operations illustrating the changes that can be made to the conventional VMREAD and VMWRITE instruction processing performed by the virtualization logic 26 are respectively set forth below in Tables 1 and 2. The pseudocode listings that are the starting point for Tables 1 and 2 may be found in the publication entitled "Intel 64® and IA-32 Architectures Software Developer's Manual, Volume 2B: Instruction Set Reference, N-Z (March 2009)." The VMREAD operation pseudocode is set forth on page 5-24 of this document and the VMWRITE operation pseudocode is set forth on pages 5-27 and 5-28. Both listings have been modified in Tables 1 and 2 to add the operations shown in bold-faced italicized text. In particular, if the secondary_control_structure field 44 is enabled, the VMREAD or VMWRITE data access is performed within the secondary control structure 42 when the instruction caller is operating in non-root mode. Otherwise, if the secondary_control_structure field 44 is not enabled, a VM-exit is performed if the caller is in non-root mode. Also, when the secondary_control_structure field 44 is enabled, its pointer value is used to locate the secondary control structure 42 in memory during the non-root mode read or write operation. The remainder of the modified VMREAD and VMWRITE pseudocode operations of Tables 1 and 2 are conventionally known to those skilled in the art, and will not be described. It will be appreciated that alternative pseudocode could be used to achieve the same effect, and that Tables 1 and 2 are merely examples of how the desired functionality could be implemented.

TABLE 1

Pseudocode for modified VMREAD instruction

IF (not in VMX operation) or (RFLAGS.VM = 1) or
(IA32_EFER.LMA = 1 and CS.L = 0)
   THEN #UD;
ELSIF in VMX non-root operation
and VMCS secondary_control_structure field not enabled
   THEN VMexit;
ELSIF CPL > 0
   THEN #GP(0);
   ELSIF current-VMCS pointer is not valid
   THEN VMfailInvalid;
ELSIF register source operand does not correspond to any VMCS field
     THEN VMfailValid(VMREAD/VMWRITE from/to unsupported VMCS component);
ELSIF if in VMX non-root operation and VMCS secondary_control_structure field enabled
       THEN DEST ← contents of VMCS field indexed by register source operand using VMCS secondary_control_structure pointer as base address instead of current-VMCS pointer;
ELSE
     DEST ← contents of VMCS field indexed by register source operand;
     VMsucceed;
FI;

TABLE 2

Pseudocode for modified VMWRITE instruction

IF (not in VMX operation) or (RFLAGS.VM = 1) or
(IA32_EFER.LMA = 1 and CS.L = 0)
   THEN #UD;
ELSIF in VMX non-root operation
and VMCS secondary_control_structure field not enabled
   THEN VMexit;
ELSIF CPL > 0

TABLE 2-continued

Pseudocode for modified VMWRITE instruction

Figure 5:
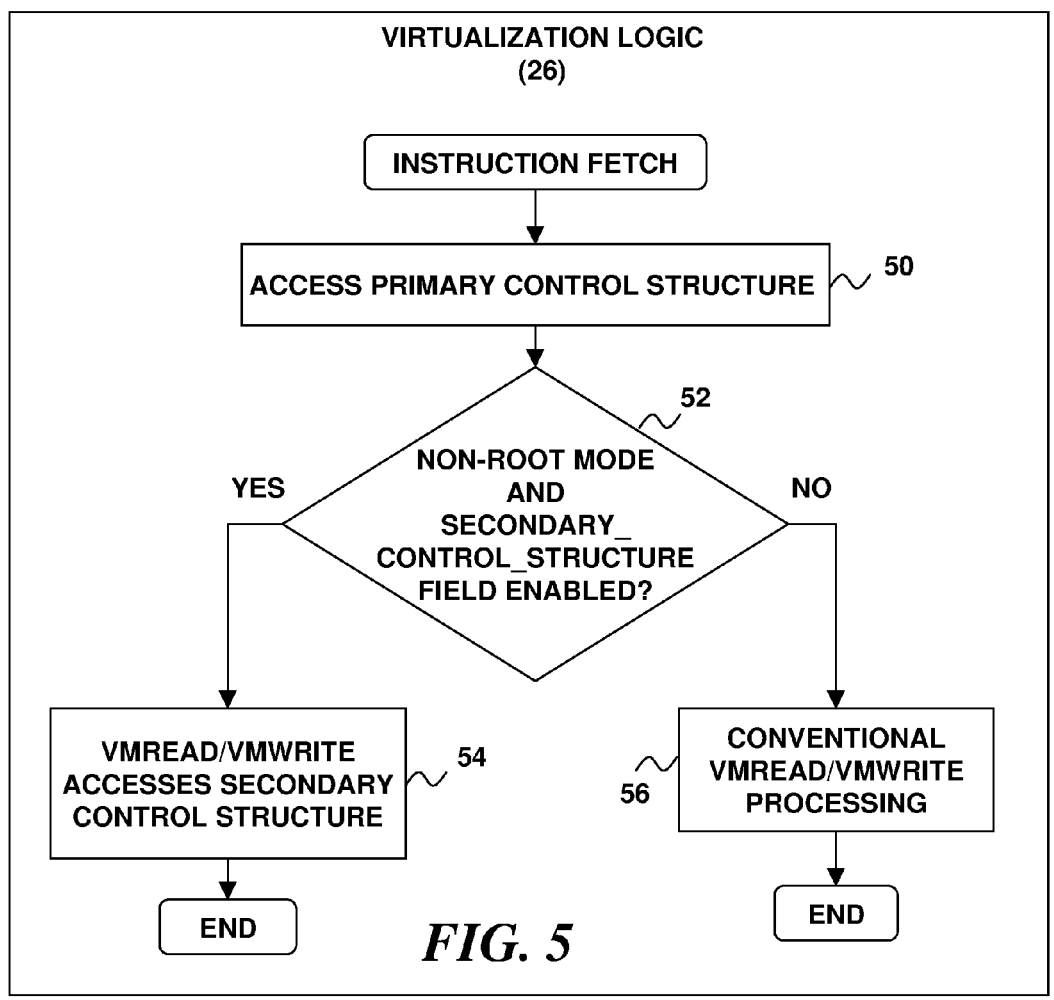
FIG. 5 is a flow diagram showing example virtualization instruction processing operations that may be performed in the system of FIG. 1.

THEN #GP(0);
ELSIF current-VMCS pointer is not valid
   THEN VMfailInvalid;
ELSIF register destination operand does not correspond to any VMCS field
   THEN VMfailValid(VMREAD/VMWRITE from/to unsupported VMCS component);
ELSIF VMCS field indexed by register destination operand is read-only)
   THEN VMfailValid(VMWRITE to read-only VMCS component);
ELSIF if in VMX non-root operation and VMCS secondary_control_structure field enabled
     THEN VMCS field indexed by register destination operand using VMCS secondary_control_structure pointer as base address instead of current-VMCS pointer ← SRC;
ELSE
   VMCS field indexed by register destination operand ← SRC;
   VMsucceed;
FI;

FIG. 5 illustrates a high-level flow diagram showing example instruction execution operations that may be implemented by the virtualization logic 26 according to the VMREAD and VMWRITE pseudocode modifications in Table 1 and Table 2. Thus, following a fetch of the VMREAD or VMWRITE instruction from the memory 12, the primary control structure 40 is accessed in block 50. In block 52, a check is made to determine if the secondary_control_structure field 44 is enabled and if the instruction caller is in non-root mode. If so, the VMREAD or VMWRITE instruction is executed relative to the secondary control structure 42 in block 54. If not, the VMREAD or VMWRITE instruction is processed in conventional fashion in block 56 (e.g., per the unmodified portions of the pseudocode above).

Figure 6:
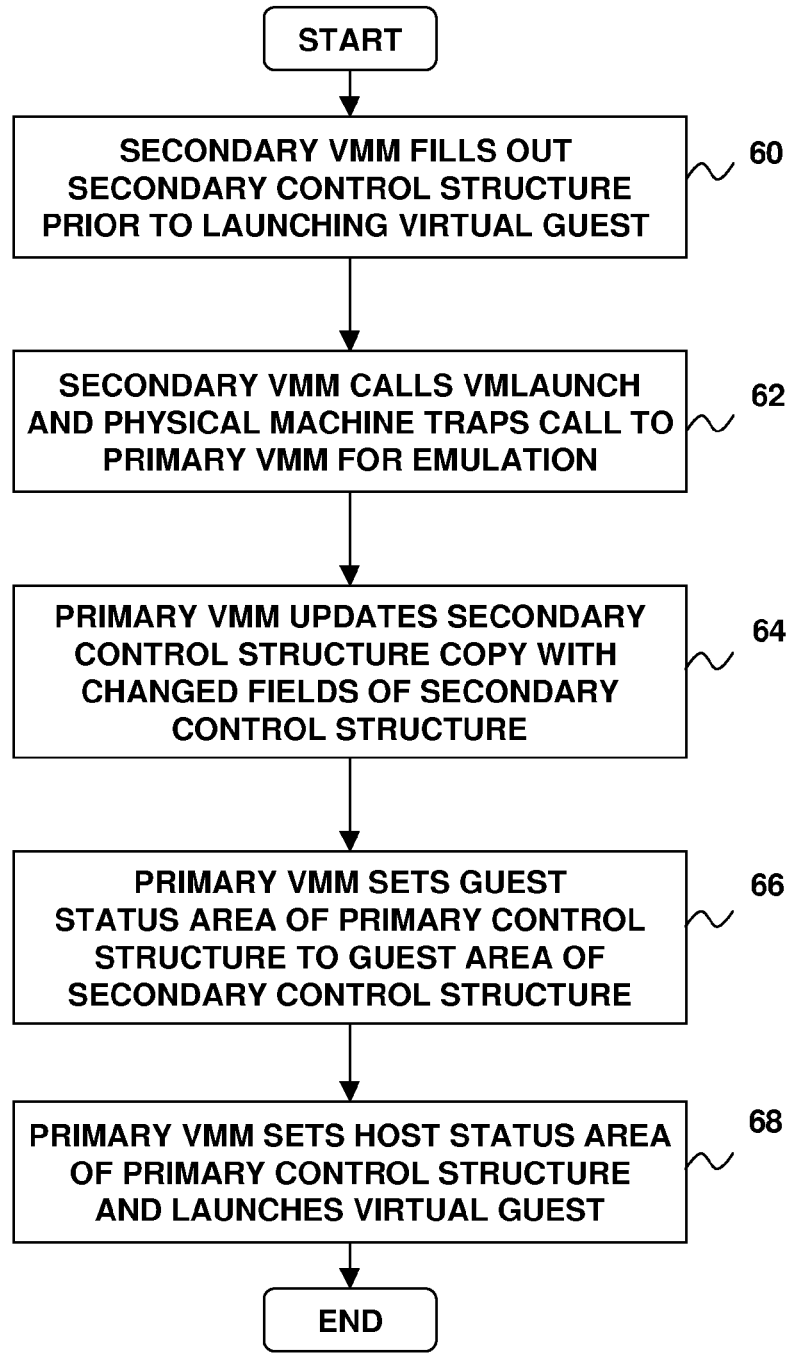
FIG. 6 is a flow diagram showing example control structure manipulation operations that may be performed in the system of FIG. 1.

Turning now to FIG. 6, a method for using the modified VMREAD and VMWRITE instructions when the secondary VMM 34 performs a VM-entry into the secondary VM 36 is shown. The virtualization logic 26 may provide two instructions that can be used by a virtual machine monitor to perform a VM-entry that transfers control to a virtual machine. One instruction could be for initial invocation of the virtual machine and the other instruction could be for resuming virtual machine operation following a transition to root mode to perform a control operation. These virtual machine launch and resume instructions could thus be respectively based on the VMLAUNCH and VMRESUME instructions provided by the Intel® VT-x virtualization architecture. Both instructions are privileged, which means that they can only be executed in real root mode. The method of FIG. 6 is based on the use of a third control structure 46 that is shown in FIG. 1. The control structure 46 is managed by the primary VMM 30 and is referred to as a secondary control structure copy because it contains a shadow copy of data stored in the secondary control structure 42. The reasons why the secondary control structure copy 46 is used to shadow the secondary control structure 42 are not pertinent to the present disclosure. Suffice it to say that the secondary control structure 42 assists the primary VMM 30 in emulating privileged instructions issued by the secondary VMM 34.

At the start of FIG. 6, the secondary VMM 34 is ready to make preparations for performing a VM-entry into the secondary VM 36. In block 60, the secondary VMM 34 updates the secondary control structure 42 to reflect this transition. In particular, the secondary VMM 34 updates the host area to save the current CPU state of the secondary VMM 34, and may also update the guest area to set the new CPU state to that of the secondary VM 36 that will execute following VM-entry. The secondary VMM 34 does this by performing multiple VMWRITE operations to fill in the required fields of the secondary control structure 42. These operations are facilitated by the above-described modifications to the virtualization logic 26, which allow the secondary VMM 34 to perform unprivileged memory store accesses to the memory area pointed to by the secondary_control_structure field 44. In block 62, the secondary VMM 34 issues a VMLAUNCH or VMRESUME instruction. The CPU 10 traps this instruction and presents it to the primary VMM 30 for emulation. In block 64, the primary VMM 30 updates the secondary control structure copy 46 according to the fields of the secondary control structure 42 that were changed as a result of block 60. In block 66, the primary VMM 30 sets the guest status area of the primary control structure 40 to the CPU state reflected in the guest status area of the secondary control structure copy 46 (i.e., the state of the secondary VMM 34 that will exist following VM-entry). In block 68, the primary VMM 30 saves the current CPU state to the host area of the primary control structure 40 and launches the secondary VM 36.

Figure 7:
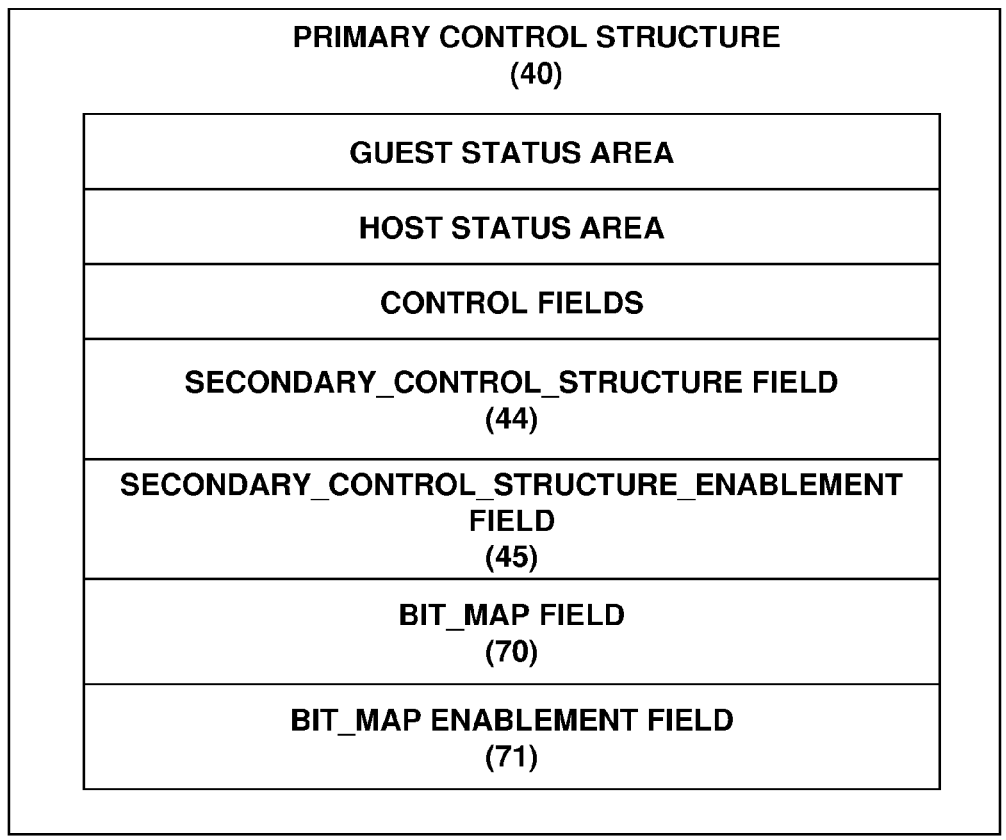
FIG. 7 is a diagrammatic illustration of another example control structure according to another disclosed embodiment.

A further modification can be made to the virtualization logic 26 that streamlines the operations shown in FIG. 5. This modification utilizes another new field in the primary control structure 40, which is the bit_map field 70 shown in FIG. 7. The bit_map field 70 may be implemented a pointer to the base address of a bit map 72 (or other mapping structure) that can be stored in the memory 12. This pointer may be set by the primary VMM 30 prior to launching the secondary VMM 34 for the first time. Each bit of the bit map 72 corresponds to a field of the secondary control structure 42. As the secondary VMM 34 issues VMWRITE instructions to fill out the fields of the secondary control structure 42 in block 60 of FIG. 6, the virtualization logic 26 sets an appropriate bit in the bit map 72 to indicate that the corresponding field of the secondary control structure 42 has been updated. This streamlines the operations of block 64 of FIG. 6 because the primary VMM 40 no longer needs to compare each field of the secondary control structure 42 with a corresponding field of the secondary control structure copy 46 to identify changes. Instead, the primary VMM 40 can quickly scan the bit map 72 associated with the secondary control structure 42 to determine which fields of the secondary control structure copy 46 need to be updated.

Example pseudocode illustrating the changes that can be made to the conventional VMWRITE instruction processing performed by the virtualization logic 26 to implement the foregoing functionality is set forth below in Table 3. Table 3 is identical to Table 2, except that an additional operation (shown in italicized boldfaced text) is performed by the virtualization logic 26 to set a bit in the bit map 72 (assuming the bit_map field 70 is enabled) to reflect the write operation to a field of the secondary control structure 42. The primary VMM 30 may enable the bit_map field 70 in any suitable fashion, such as by setting a bit in a control field of the primary control structure 40. This bit is shown by reference number 71 in FIG. 7, and may be referred to as a bit_map_enablement field. By way of example only, if the primary control structure 40 is based on the VMCS used in the Intel® VT-x virtualization architecture, a bit could be set in the Secondary Processor-Based VM-Execution Controls vector. Optionally, the bit_map_enablement field 71 could be eliminated, depending on design requirements. It will be appreciated that alternative pseudocode could be used to achieve the same effect, and that Table 3 is merely an example of how the desired functionality could be implemented.

TABLE 3

Pseudocode for further modified VMWRITE instruction

Figure 8:
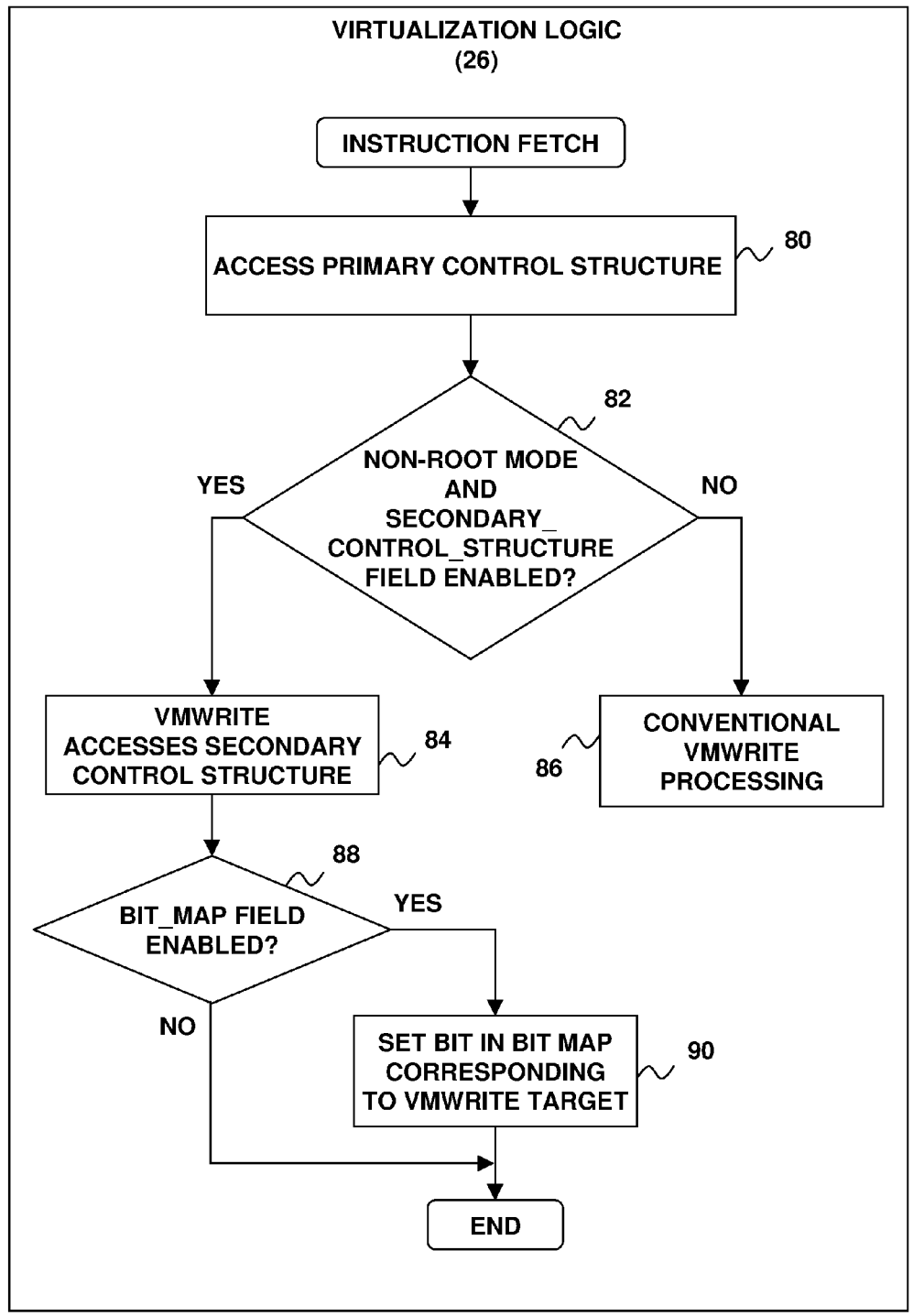
FIG. 8 is a flow diagram showing additional example control structure manipulation operations that may be performed in the system of FIG. 1.

IF (not in VMX operation) or (RFLAGS.VM = 1) or
(IA32_EFER.LMA = 1 and CS.L = 0)
   THEN #UD;
ELSIF in VMX non-root operation and VMCS
secondary_control_structure field not enabled
   THEN VMexit;
ELSIF CPL > 0
   THEN #GP(0);
ELSIF current-VMCS pointer is not valid
   THEN VMfailInvalid;
ELSIF register destination operand does not correspond to any
VMCS field
   THEN VMfailValid(VMREAD/VMWRITE from/to
   unsupported VMCS component);
ELSIF VMCS field indexed by register destination operand is read-only)
   THEN VMfailValid(VMWRITE to read-only VMCS component);
ELSIF if in VMX non-root operation and VMCS
secondary_control_structure field enabled
      THEN VMCS field indexed by register destination operand
      using VMCS secondary_control_structure
      pointer as base address instead of current-VMCS pointer ← SRC
      *IF bit_map field enabled*
      *THEN set bit in bitmap pointed to by VMCS*
      *bit_map field that corresponds to*
      *VMCS*
        *field indexed by register destination operation*;
   ELSE
      VMCS field indexed by register destination operand ← SRC;
      VMsucceed;
FI;

FIG. 8 illustrates a high-level flow diagram showing example instruction execution operations that may be implemented by the virtualization logic 26 according to the VMWRITE pseudocode modifications in Table 2 and Table 3. Thus, following a fetch of the VMWRITE instruction from the memory 12, the primary control structure 40 is accessed in block 80. In block 82, a check is made to determine if the secondary_control_structure field 44 is enabled and if the instruction caller is in non-root mode. If so, the VMWRITE instruction is executed relative to the secondary control structure 42 in block 84. If not, the VMREAD or VMWRITE instruction is processed in conventional fashion in block 86 (e.g., per the unmodified portions of the pseudocode of Table 2 above). Following block 84, the bit_map field 70 is checked for enablement. If the bit_map field 70 is enabled, a bit is set in block 90 that corresponds to the VMWRITE target field. Processing ends following block 90 or if the bit_map field 70 is not enabled in block 88.

Accordingly, a technique has been disclosed for improving the performance of nested virtualization in a computer system. It will be appreciated that the foregoing concepts may be variously embodied in any of a machine implemented method (including but not limited to CPU microcode operations), a CPU or other instruction processing device that may include circuit logic, instructions stored within a storage medium (code) that when executed by processing circuitry causes the circuitry to perform operations, or a combination of circuit logic and code, and a system such as a computer or other data processing machine or device. Aspects of the disclosed subject matter may also be implemented by a computer program product in which digitally encoded program instructions (including but not limited to a CPU microcode program) are stored on one or more computer-readable data storage media for use in controlling a CPU or other instruction processing device to perform operations. The program instructions may be comprise machine language code that is ready for loading and execution by the machine, or the program instructions may comprise a higher level language that can be assembled, compiled or interpreted into machine language. When implemented on a machine comprising a CPU or other instruction processing device, the program instructions control the CPU to provide a particular machine that operates analogously to specific logic circuits, which themselves could be used for the invention.

Example data storage media for storing program instructions of a computer program product include any storage media can store the program instructions. The media could be provided by read-only memory (ROM), random access memory (RAM) or other semiconductor or solid state memory of the type used in CPUs or otherwise within computers and data processing machines. The media could also be provided by portable magnetic, optical or magneto-optical media (such as floppy disks, flash memory sticks, etc.), or magnetic media combined with drive systems (e.g. disk drives). More broadly, the media could comprise any electronic, magnetic, optical, electromagnetic, infrared, semiconductor system or apparatus or device, transmission or propagation or signaling medium, or any other entity that can contain, store, communicate, propagate or transport the program instructions for use by or in connection with an instruction execution system, apparatus or device, such as a computer. For all of the above forms of media, when the program instructions are loaded into and executed by an instruction execution system, apparatus, device or circuitry, the resultant programmed system, apparatus, device or circuitry becomes a particular machine for practicing embodiments of the methods and systems as described herein.

The CPU 10, its virtualization logic 26, and any subcomponent thereof implemented according the present disclosure may be designed in various stages, from creation, to simulation, to test, to layout, to fabrication. Design structures processed and/or generated during this design flow may be encoded on machine-readable transmission or storage media to include data and/or instructions that when executed or otherwise processed on a data processing system generate a logically, structurally, mechanically, or otherwise functionally equivalent representation of hardware components, circuits, devices or systems. The design structures may be represented in various ways, including using a hardware description language (HDL) or another functional description language to simulate or otherwise functionally represent an electronic component, circuit, electronic or logic module, apparatus, device or system. The design structures will contain elements that when processed in a computer-aided design system generate a machine-executable representation of the electronic component, circuit, electronic or logic module, apparatus, device or system. Such elements may include, but are not limited to symbolic data, map files, test data files, design content files, manufacturing data, layout parameters, wires, levels of metal, vias, shapes, data for routing through a manufacturing line, and any other data required by a manufacturer or other designer/developer to produce an electronic component, circuit, electronic or logic module, apparatus, device or system.

While various embodiments of the invention have been described, it should be apparent that many variations and alternative embodiments could be implemented in accordance with the invention. It is understood, therefore, that the invention is not to be in any way limited except in accordance with the spirit of the appended claims and their equivalents.

What is claimed is:

1. A central processing unit (CPU) apparatus including virtualization instruction execution logic (virtualization logic), said virtualization logic being configured to perform instruction execution operations for improving the performance of nested virtualization in a computer system, said operations comprising:
    fetching a virtualization instruction from a memory, said virtualization instruction being a control structure read or write instruction for reading or writing data in a control structure used by a virtual machine monitor (VMM) to maintain state on a virtual machine (VM) to support transitions between a root mode of operation of said CPU in which said VMM executes and a non-root mode of operation of said CPU in which said VM executes;
    performing a privileged data access to a primary control structure of a primary VMM according to said virtualization instruction if said CPU is in said root mode, wherein said primary control structure is used by said primary VMM to maintain state on a primary VM; and
    performing a non-privileged data access to a secondary control structure of a secondary VMM according to said virtualization instruction if said CPU is in said non-root mode and a secondary control structure field in said primary control structure is enabled, wherein said secondary control structure is used by said secondary VMM to maintain state on a secondary VM nested within the primary VM.

2. The apparatus of claim 1, wherein said secondary control structure is accessed using access information maintained in said secondary control structure field.

3. The apparatus of claim 2, wherein said enablement of said secondary control structure field is determined from a secondary control structure enablement field in said primary control structure that enables said secondary control structure field.

4. The apparatus of claim 1, wherein if said non-privileged data access to said secondary control structure is a write operation, recording information about said write operation in a mapping structure that maps data updates made to said secondary control structure.

5. The apparatus of claim 4, wherein said mapping structure is accessed using a mapping field in said primary control structure.

6. The apparatus of claim 5, wherein said mapping structure is a bit map that includes bits corresponding to fields of said secondary control structure, and wherein said recording of information in said mapping structure includes setting an appropriate bit in said bit map.

7. A system including a central processing unit (CPU), a memory operatively connected to CPU, and virtualization instruction execution logic (virtualization logic) in said CPU, said virtualization logic being configured to perform instruction execution operations for improving the performance of nested virtualization in the system, said operations comprising:
    fetching a virtualization instruction from said memory, said virtualization instruction being a control structure read or write instruction for reading or writing data in a control structure used by a virtual machine monitor (VMM) to maintain state on a virtual machine (VM) to support transitions between a root mode of operation of said CPU in which said VMM executes and a non-root mode of operation of said CPU in which said VM executes;
    performing a privileged data access to a primary control structure of a primary VMM according to said virtualization instruction if said CPU is in said root mode, wherein said primary control structure is used by said primary VMM to maintain state on a primary VM; and performing a non-privileged data access to a secondary control structure of a secondary VMM according to said virtualization instruction if said CPU is in said non-root mode and a secondary control structure field in said primary control structure is enabled, wherein said secondary control structure is used by said secondary VMM to maintain state on a secondary VM nested within the primary VM.

8. The system of claim 7, wherein said secondary control structure is accessed using access information maintained in said secondary control structure field.

9. The system of claim 8, wherein said enablement of said secondary control structure field is determined from a secondary control structure enablement field in said primary control structure that enables said secondary control structure field.

10. The system of claim 7, wherein if said non-privileged data access to said secondary control structure is a write operation, recording information about said write operation in a mapping structure that maps data updates made to said secondary control structure.

11. The system of claim 10, wherein said mapping structure is accessed using a mapping field in said primary control structure.

12. The system of claim 11, wherein said mapping structure is a bit map that includes bits corresponding to fields of said secondary control structure, and wherein said recording of information in said mapping structure includes setting an appropriate bit in said bit map.

13. A system including a central processing unit (CPU), a memory operatively connected to CPU, virtualization instruction execution logic (virtualization logic) in said CPU, and program instructions said memory, said virtualization logic and said program instructions supporting a virtualization environment comprising a physical machine, a primary virtual machine (primary VM) running on the physical machine, and a secondary virtual machine (secondary VM) running on the primary VM, and supporting operations for improving the performance of nested virtualization, said operations comprising:

executing a primary virtual machine monitor (primary VMM) on said physical machine to provide said primary VM;

executing a secondary virtual machine monitor (secondary VMM) as a guest on said primary VM to provide said secondary VM;

said physical machine having a real root mode of operation in which said primary VMM operates to control said primary VMM, and a real non-root mode of operation in which guests of said primary VM, including said secondary VM, operate;

said primary VM having a virtual root mode of operation in which said secondary VMM operates to control said secondary VMM, and a virtual non-root mode of operation in which guests of said secondary VM operate;

providing a primary control structure for use by said primary VMM to maintain state on said primary VM to support transitions between said real root mode and said real non-root mode;

providing a secondary control structure for use by said secondary VMM to maintain state on said secondary VM to support transitions between said virtual root mode and said virtual non-root mode;

implementing an instruction set used by said primary VMM for providing said primary VM and by said secondary VMM for providing said secondary VM; and said instruction set including control structure read and write instructions that are executable only by said primary VMM in said real root mode when reading and writing data in said primary control structure, but which are executable by said secondary VMM in said virtual root mode when reading and writing said secondary control structure via indirect access from said primary control structure without support from said primary VMM if a secondary control structure field in said primary control structure is enabled.

14. The system of claim 13, further including:

said primary control structure comprising a field for maintaining information about a mapping structure that maps to fields of said secondary control structure;

setting a field in said mapping structure that corresponds to a field of said secondary control structure that is being written in response to said control structure write instruction; and said primary VMM copying fields of said secondary control structure to a secondary control structure copy using said mapping structure to identify fields of said secondary control structure that have been written with new data.

* * * * *